(12) United States Patent
Lemaguet

(10) Patent No.: US 6,314,138 B1
(45) Date of Patent: Nov. 6, 2001

(54) METHOD OF SWITCHING BETWEEN VIDEO SEQUENCING AND CORRESPONDING DEVICE

(75) Inventor: Yann Lemaguet, Paris (FR)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/120,292

(22) Filed: Jul. 21, 1998

(51) Int. Cl.[7] .................................................. H04B 1/66
(52) U.S. Cl. ........................ 375/240; 382/234; 382/238
(58) Field of Search ........................... 348/402, 405, 348/423, 419, 387, 500, 392; 370/79, 108; 379/88; 375/240, 243, 245

(56) References Cited

U.S. PATENT DOCUMENTS

| | | | |
|---|---|---|---|
| 4,706,260 | * 11/1987 | Fedele et al. | 375/27 |
| 5,455,829 | * 10/1995 | Klingberg | 370/108 |
| 5,513,181 | * 4/1996 | Bresalier et al. | 370/79 |
| 5,537,440 | * 7/1996 | Eyuboglu et al. | 348/405 |
| 5,544,266 | * 8/1996 | Koppelmans et al. | 348/402 |
| 5,550,589 | * 8/1996 | Shiojiri et al. | 348/387 |
| 5,583,562 | * 12/1996 | Birch et al. | 348/423 |
| 5,606,371 | * 2/1997 | Klein Gunnewiek et al. | 349/405 |
| 5,608,779 | * 3/1997 | Lev et al. | 379/88 |
| 5,621,820 | * 4/1997 | Rynderman et al. | 348/419 |
| 5,623,308 | * 4/1997 | Civanlar et al. | 348/392 |
| 5,764,298 | * 6/1998 | Morrison | 348/500 |
| 5,835,498 | * 11/1998 | Kim et al. | 348/423 |

FOREIGN PATENT DOCUMENTS

| | | | |
|---|---|---|---|
| 0690392 A | * 3/1996 | (EP) . | |
| WO 9529561 A | * 11/1995 | (WO) . | |
| WO 9625823 A | * 8/1996 | (WO) . | |
| WO9708898 | 3/1997 | (WO) . | |
| WO 9708898 A | * 6/1997 | (WO) . | |

OTHER PUBLICATIONS

"Splicing MPEG Video Streams in the Compressed Domain", by Susie J. Wee et al, IEEE Workshop on Multimedia Signal Processing, Jun. 23, 1997, pp. 225–230, XP000957700.

* cited by examiner

Primary Examiner—Chris Kelley
Assistant Examiner—Shawn S. An
(74) Attorney, Agent, or Firm—Laurie E. Gathman

(57) ABSTRACT

The invention relates, in encoding/decoding systems, to an improved method of switching from a first coded video sequence to a second one. In order to avoid underflow or overflow of the decoder buffer, a transcoding of the input streams IS1 and IS2 is used to shift the temporal position of the switching point and to obtain at the output of the provided transcoders (11, 12) streams TS1 and TS2 containing an identical entry point and the same decoder buffer characteristics.

5 Claims, 2 Drawing Sheets

METHOD OF SWITCHING BETWEEN VIDEO SEQUENCING AND CORRESPONDING DEVICE

BACKGROUND OF THE INVENTION

The present invention relates to a method of switching from a first coded video sequence to a second one, said video sequences having been encoded by different video encoders using regulation buffers, and to a corresponding switching device. This invention may be used for instance in MPEG1 or MPEG2 encoding/decoding systems.

Encoding systems such as those according to the MPEG2 standard produce data at variable rates (encoded pictures have variable sizes in bits) and require an output data buffer in order to feed the (constant bitrate) transmission channel. Similarly the corresponding decoders require an input data buffer to enable them to use data from said channel at the required variable rates. The transmitted encoded pictures will therefore not spend the same time in the decoder buffer. As a consequence, when switching from a first video sequence to a second one, the respective decoder buffer delays at the transition (or switching point) are not equal.

It is known indeed that, thanks to the abstract model of decoding VBV (Video Buffer Verifier) defined in the MPEG standard, it is possible to verify that an MPEG bitstream is decodable with reasonable buffering and delay requirements (expressed in the sequence header, in the fields "bitrate" and "buffer size"). This model of VBV is that of a receiving buffer for the coded bitstream and an associated instantaneous decoder so that all the data for a picture are instantaneously removed from said receiving buffer. Within the framework of this model, constraints on the bitstream (by way of the buffer occupancy) have been defined so that decoding can occur without buffer underflow or overflow. If said first and second sequences to be switched have been separately encoded, such a risk of overflow or underflow for the decoder buffer however exists.

In order to prevent such a risk, the switching operation may be performed in the decompressed domain where all the decoded pictures are again described with the same number of bits and last a same duration. Said pictures are then sent to a conventional mixer for switching, and recoded before transmission. Such a solution, described for example in the international patent application WO 97/08898, is however rather complex. Moreover, a decoding step followed by a re-encoding one damages the picture quality.

SUMMARY OF THE INVENTION

It is therefore an object of the invention to propose another switching method that overcomes these drawbacks.

To this end the invention relates to a switching method such as described in the preamble of the description and wherein the switching step is preceded by a transcoding step of each of said coded sequences, provided for shifting the temporal position of the switching point. The invention also relates to a corresponding device.

The basic idea of this solution is to transcode the input encoded streams such that they have at the switching point, now chosen a posterior, the same decoder buffer characteristics, and particularly buffer delays that now are equal.

BRIEF DESCRIPTION OF THE DRAWINGS

The particularities and advantages of the invention will now become apparent from the following description and the accompanying drawings, in which.

DETAILED DESCRIPTION OF THE PREFERRED EMBODIMENT

Figure 1:
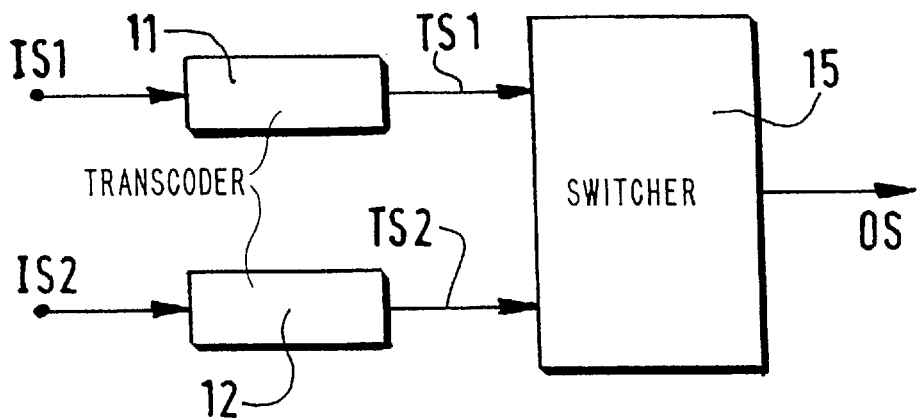
FIG. 1 is an illustration of the method and device according to the invention.

The switching method and device according to the invention are illustrated in FIG. 1, that shows transcoding devices 11 and 12 receiving input coded streams IS1 and IS2 (corresponding to first and second original video sequences, for instance to a national television programme and to a local one) and delivering corresponding output transcoded streams TS1 and TS2. These streams TS1 and TS2 now contain an identical entry point, as it will be explained, and may be sent towards the switcher 15. At the output of said switcher, an output stream OS is available that corresponds, with respect to the input streams, to that one called the second video sequence, the other input stream being then the first one.

In a transcoding operation, a compressed sequence with a first given format is converted into another one with another format. The transcoding operation here proposed is used to shift the temporal position of the switching point so that the input coded streams will have the same decoder buffer characteristics (which was not the case for separately encoded streams). This shifting of the temporal position of the switching point is obtained by modifying the number of bits allocated to the encoding of the video parts preceding and following said switching point, while the total number of bits used by each transcoded stream remains equal to the one used by the corresponding input stream.

Figure 2:
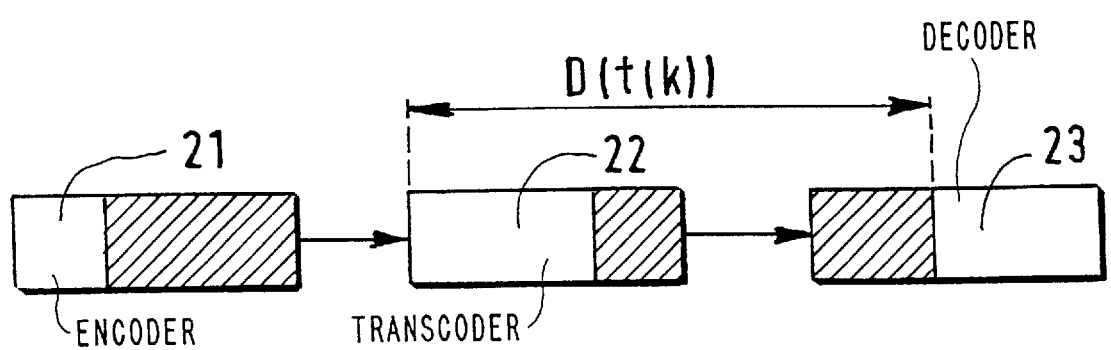
FIG. 2 shows a transmission chain including a transcoder.

A transmission chain is illustrated in FIG. 2: it includes a transcoder 22 between an encoder 21 and a decoder 23, shown with their buffers. According to the invention, the output bit rate of each transcoder is equal to its input bit rate. There is indeed no change in the bit rate, only the picture start positions are changed (shifted) in order to create a seamless splicing point keeping ensured the stability of the decoder buffer.

The transcoding operation has to ensure the decoder buffer stability for the output stream, and must therefore avoid overflow or underflow of said buffer. Critical times for the decoder buffer overflow are the ones just before decoding a picture, i.e. the times $D(t(k))+t(k)$, the notations being the following ones:

$t(k)$=time at which the start code of the picture number k enters the transcoder;

$D(t(k))$=delay between transcoder buffer input and decoder output (as seen for instance in FIG. 2)

By definition of $D(t(k))$, one has:

$$D(t(k)) = VBV\_delay\_out(k) + F(t(k))/R \quad (1)$$

and:

$$D(t(k)) + t(k) = D(t(k-1)) + t(k-1) + 1/P \quad (2)$$

with: P=frame rate (and 1/P=fire period).

R=video bit rate

F(.)=transcoder buffer fullness at concerned time (.).

VBV_delay_out(k)=VBV delay of picture number k at the transcoder output/decoder input.

For defining the VBV delay, one must recall that the VBV (Video Buffering Verifier), considered as connected to the output of the encoder, has the same clock frequency and picture rate as said encoder (they are operated synchronously). The VBV has a decoding buffer of size S (where S is given in the so-called vbv_buffer_size field of the sequence header) that is initially empty and is filled by the bitstream for a time specified in the so-called vbv_delay_field of the video bitstream. After each picture interval, all of the data for the picture which, at that time, has been in the buffer longest is instantaneously removed. The VBV is examined immediately before removing any data and immediately after each picture is removed, and its occupancy must then lie between 0 and S bits.

In the present case, to avoid overflow and underflow of the decoder buffer, the transcoder buffer fullness has therefore to be bounded. The boundaries B(MIN) and B(MAX) are defined according to the following relation:

$$B(MIN) \leq F(t(k)) \leq B(MAX) \quad (3),$$

by considering the decoder at the most critical times.

For the decoder buffer overflow, said critical times are the ones just before decoding a picture (i.e. the times t(k)+D(t(k)). Just before such times, the decoder buffer fullness, at time t(k)+D(t(k)), is given by FDEC(t(k)+D(t(k))):

$$FDEC(t(k) + D(t(k)) = \int_{t(j)}^{t(k)+D(t(k))} R_{indec}(t) \cdot dt - \left\{ F(t(j)) + \sum_{i=j}^{k-1} sizepic(i) \right\}$$

with:
tj=time at which the decoder buffer is considered as empty;
$R_{indec}$=bit rate at the decoder buffer input (=$R_{out}$);
$R_{out}$=bit rate at the transcoder buffer output;
sizepic(i)=size of the picture i.

As it is wanted that FDEC (t(k)+D(t(k))≦S (S being, as already said, the decoder buffer size), it can be deduced, after some computations, that:

$$B(MIN) = MAX \left\{ 0, \int_{t(k)}^{t(k)+D(t(k))} R_{out}(t) \cdot dt - S \right\} \quad (4)$$

Similarly, for the decoder buffer underflow, the most critical times are the ones just after decoding a picture (i.e. the times t(k)+D(t)(K)), which allows to deduce, after some similar computations, the relation giving B(MAX):

$$B(MAX) = \int_{t(k)}^{t(k)+D(t(k))-1/P} R_{out}(t) \cdot dt \quad (5)$$

Figure 3:
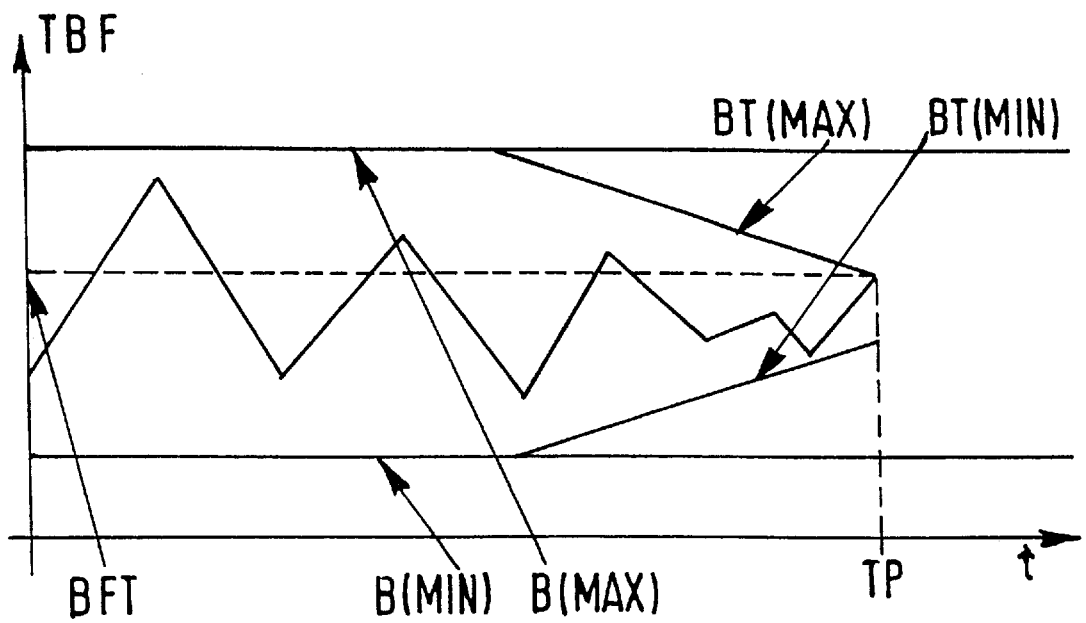
FIG. 3 shows an example of transcoder buffer boundaries corresponding to measures taken during the transcoding step.

Moreover, the transcoding has to guarantee a specified decoder buffer delay at the transition point, which leads to a determined transcoder buffer fullness value at the transition point. Two other boundaries converging toward this value have therefore to be introduced. An illustration of all these transcoder buffer boundaries is given in FIG. 3 (transcoder buffer fullness TBF versus time t), with the following notations:

B(MIN) and B(MAX), for the lower and upper boundaries introduced by the decoder buffer stability constraints;

BFT, for the buffer fullness to be guaranteed at the transition point TP;

BT(MIN) and BT(MAX), for the converging boundaries introduced by the transition point constraints.

Figure 4:
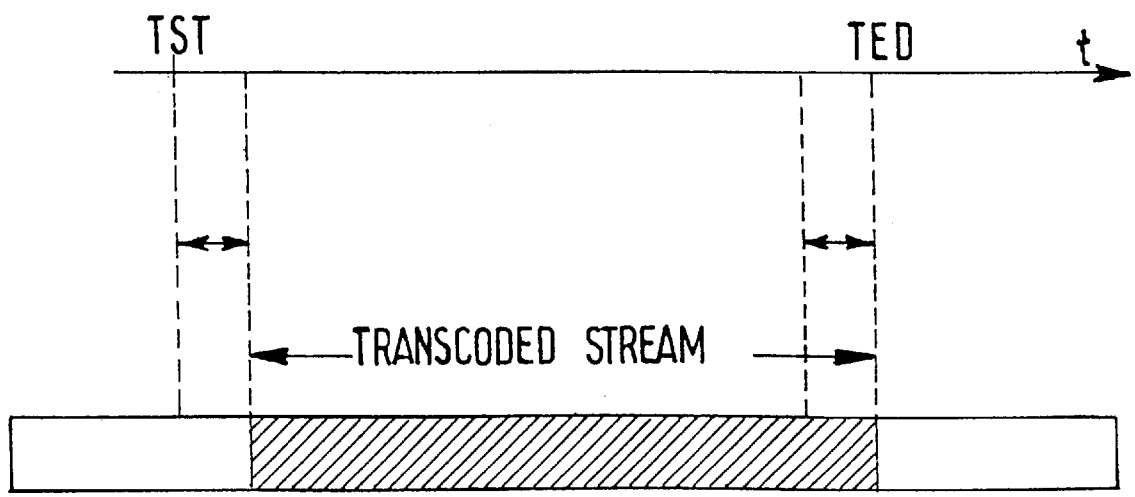
FIG. 4 shows the transcoded bitstream.

It must also be indicated that the transcoding operation is only useful, and therefore only performed, within a temporal window positioned around the transition point arrival time in the transcoder. As shown in FIG. 4, this temporal window starts a sufficient delay (transcoding start=TST) before the transition point arrival time, so that the wanted decoder buffer constraints are really obtained at this point, and also ends another sufficient delay (transcoding end=TED) after said transition point arrival time, so that the decoder buffer characteristics of the transcoded stream become equal to the ones of the corresponding input stream. Outside this temporal window, the transcoder is equivalent to a delay line, said delay having no effect on the image quality.

Figure 5:
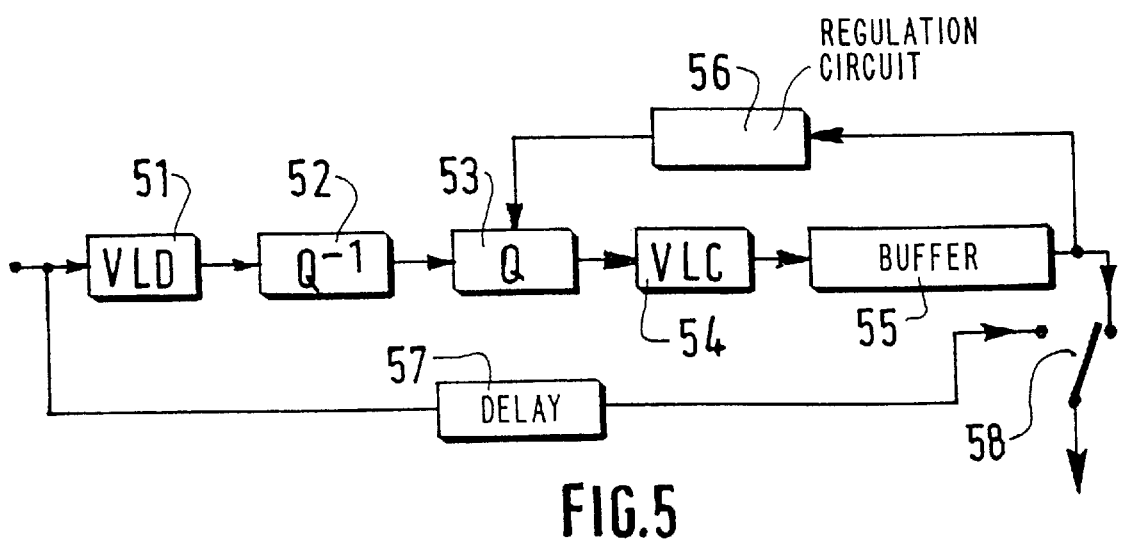
FIG. 5 shows an implementation of each transcoding circuit of a device according to the invention.

The structure of each transcoding device of FIG. 1 is therefore the following, as illustrated in FIG. 5: it comprises in series a variable length decoder 51, an inverse quantizer 52, a quantizer 53, a variable length encoder 54 (also designated by the references VLD, $Q^{-1}$, Q and VLC respectively), and a buffer 55. A regulation circuit 56 provided at the output of said buffer allows to modify the quantization stepsize in the quantizer 53. In parallel with the first branch constituted by these elements 51 to 56, a delay line 57 forming a second branch is provided (the delay it introduces is equal to the transcoding delay). A switching circuit 58 receives on two inputs the outputs of said first and second branches. As already seen, the input bit rate at the inputs of said branches and the output bitrate at the output of the switching circuit 58 have the same value.

What is claimed is:

1. A method of switching from a first coded video sequence to a second coded video sequence which video sequences have been encoded by different video encoders using regulation buffers, comprising the steps of:

transcoding the first coded video sequence;

transcoding the second coded video sequence, such that the first and second coded video sequences have substantially similar decoder buffer characteristics, wherein the steps of transcoding modify the number of bits allocated to the portions of the coded video sequences which precede and follow a switching point while the output bitrate of each step of transcoding remains substantially equal to its input bitrate, thereby shifting the temporal position of the switching point; and switching from the first transcoded video sequence to the second transcoded video sequence wherein an output stream corresponds to only one of the coded video sequences.

2. A device for switching from a first coded video sequence to a second coded video sequence, wherein said video sequences have been encoded by different video encoders using regulation buffers, comprising:

a first transcoding circuit which transcodes the first coded video sequence;

a second transcoding circuit which transcodes the second coded video sequence, wherein the transcoding circuits shift the temporal position of a switching point; and a switching circuit coupled to the first transcoding circuit and the second transcoding circuit and which provides an output stream corresponding to only one of the coded video sequences.

3. A device for switching from a first coded video sequence to a second coded video sequence, wherein said video sequences have been encoded by different video encoders using regulation buffers, comprising:

a first transcoding circuit which transcodes the first coded video sequence;

a second transcoding circuit which transcodes the second coded video sequence wherein the transcoding circuits modify the number of bits allocated to the portions of the coded video sequences preceding and following a switching point while ensuring that the output bit rate of each transcoder remains substantially equal to its input bit rate, thereby shifting the temporal position of the switching point and;

a switching circuit coupled to the first transcoding circuit and the second transcoding circuit and which provides an output stream corresponding to only one of the coded video sequences.

4. A method of switching from a first coded video sequence to a second coded video sequence which video sequences have been encoded by different video encoders using regulation buffers, comprising the steps of:

transcoding the first coded video sequence;

transcoding the second coded video sequence, such that the number of bits allocated to the portions of the first and second coded video sequences preceding and following a switching point is modified to shift the temporal position of the switching point; and switching from the first transcoded video sequence to the second transcoded video sequence.

5. A device for switching from a first coded video sequence to a second coded video sequence which video sequences have been encoded by different video encoders using regulation buffers, comprising:

a first transcoder which transcodes the first coded video sequence;

a second transcoder which transcodes the second coded video sequence such that the number of bits allocated to the portion of the first and second coded video sequences preceding and following a switching point is modified to shift the temporal position of the switching point; and a switch which switches at the switching point from outputting the first transcoded sequence to outputting the second transcoded sequence.

* * * * *